(12) United States Patent
Denber

(10) Patent No.: US 6,233,547 B1
(45) Date of Patent: May 15, 2001

(54) COMPUTER PROGRAM PRODUCT FOR RETRIEVING MULTI-MEDIA OBJECTS USING A NATURAL LANGUAGE HAVING A PRONOUN

(75) Inventor: Michel J. Denber, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/207,453

(22) Filed: Dec. 8, 1998

(51) Int. Cl.[7] .............................. G06F 17/27; G06F 17/30
(52) U.S. Cl. ................................ 704/9; 707/3; 707/104
(58) Field of Search ...................... 704/9, 10, 1; 707/3, 707/4, 5, 6, 100, 104

(56) References Cited

U.S. PATENT DOCUMENTS

| | | | |
|---|---|---|---|
| 5,265,014 | * | 11/1993 | Haddock et al. ......................... 704/9 |
| 5,386,556 | * | 1/1995 | Hedin et al. .............................. 707/4 |
| 5,493,677 | | 2/1996 | Balogh et al. .......................... 707/104 |
| 5,895,464 | * | 4/1999 | Bhandari et al. ......................... 707/3 |
| 5,963,940 | * | 10/1999 | Liddy et al. .............................. 707/5 |
| 6,026,388 | * | 2/2000 | Liddy et al. .............................. 707/1 |
| 6,076,051 | * | 6/2000 | Messerly et al. ......................... 704/9 |
| 6,101,492 | * | 8/2000 | Jacquemin et al. ....................... 707/3 |

OTHER PUBLICATIONS

Barnett, et al., "Knowledge and Natural Language Processing", Communications of the ACM, vol. 33, No. 8, p. 50 (22)—DIALOG File 275, Acc. No. 01372855, Aug. 1990.*

* cited by examiner

*Primary Examiner*—Joseph Thomas
(74) *Attorney, Agent, or Firm*—David M. Woods

(57) ABSTRACT

A computer program product for retrieving multi-media objects uses a natural language having a pronoun. The computer program product includes a computer readable storage medium having a computer program stored thereon for performing the steps of receiving a query in the natural language containing the pronoun; determining the pronoun in the query; determining whether either a phrase or sentence containing the pronoun conforms to a predetermined phrase structure; determining a noun or noun phrase to which the pronoun refers; and processing the query.

15 Claims, 5 Drawing Sheets

COMPUTER PROGRAM PRODUCT FOR RETRIEVING MULTI-MEDIA OBJECTS USING A NATURAL LANGUAGE HAVING A PRONOUN

CROSS-REFERENCE TO RELATED APPLICATIONS

The present application is related to U.S. Pat. No. 5,895,464, filed Apr. 30, 1998, by Archna Bhandaii et. el., and titled, "A COMPUTER PROGRAM PRODUCT AND A METHOD FOR USING NATURAL LANGUAGE FOR THE DESCRIPTION, SEARCH AND RETRIEVAL OF MULTI-MEDIA OBJECTS".

FIELD OF THE INVENTION

The invention relates generally to the field of retrieval of multi-media objects such as still images, videos, graphics, computer generated graphics, drawings and the like, and specifically, to retrieving multi-media objects using a natural language, such as English, that includes anaphonic phrases or sentences.

BACKGROUND OF THE INVENTION

Multi-media objects carry a great deal of information and as multi-media technology is growing, there has been an increasing demand for a system that allows users to easily describe, archive, search and retrieve these multi-media objects. Some conventional methods and their limitations are described as follows.

In the past, people have used shoe boxes, albums and the like to archive images and then search and retrieval of these images is performed based on the user's memory. Stock agencies have used index cards to keep track of stock images and search and retrieval is done using personnel experiences and preferences. Such methods of archiving and retrieving images are difficult, time-consuming and expensive. These methods are also subjective in nature.

As computers became popular and more images were stored on-line, a keyword based approach was developed. Keyword representations can be created either manually or automatically. In the manual approach, a set of keywords are assigned to each image in the database. The keywords describe the image content of interest (i.e. objects, events, concepts, place, activities, etc.) The KODAK PICTURE EXCHANGE (KPX) uses this approach. A shortcoming of this approach is that a multi-media object, in this instance images, can not always be described by a disjoint set of keywords. This method of image retrieval depends on an exact match of a keyword used in the description and in the search, and the keywords used to describe/retrieve an image may change from user to user. Some incremental improvements can be made to this method by use of a thesaurus.

In the automatic approach, keywords are selected from within the document itself based on statistics pertaining to the relative frequency of word occurrence. This approach is more suitable for document retrieval applications where a large amount of text is available to obtain accurate statistics, such as in the area of newspaper article retrieval. Many text retrieval engines have been developed using this approach. However, in the case of images, the caption will typically be a sentence or two, which is not enough to extract meaningful statistics. Another limitation of the keyword-based technique for image retrieval is that only the words, and not the meaning or context, are taken into account. This makes this technique unsuitable for applications that contain a sparse amount of text to describe an image.

Images also can be searched and retrieved using image content analysis techniques. Image content attributes are defined using color, texture, shape and the like. Some of the existing systems that perform image content analysis are QBIC from IBM, and Virage from Virage Corporation. The drawback of this approach is it only allows for image similarity type search and retrieval, such as responding to queries of the form "Find me images like this one . . . ".

The University of Buffalo has developed a system, PICTION, which uses natural language captions to label human faces in an accompanying newspaper photograph. A key component of the system is the utilization of spatial and characteristic constraints (derived from captions) in labeling face candidates (generated by a face locator). The system is limited to only identifying faces based upon the spatial constraints defined in the caption, for example "John Doe is to the left of Jane Doe . . . ".

Anil Chakravarthy at MIT has developed a program as part of his thesis "Information Access and Retrieval with Semantic Background Knowledge" for retrieving captions of pictures and video clips using natural language queries. This thesis presents a limited framework for structured representation through the incorporation of semantic knowledge. However, the program only accepts images accompanied by well-formed single sentence description. Queries also need to be well-formed single sentence descriptions.

U.S. Pat. No. 5,493,677 discloses a natural language archival and retrieval system for images. This patent discloses inputting a search query in a natural language and then searching for archived images. It identifies name, location and noun phrases from the query; other words are eliminated. For example, prepositions are not used for further processing. This eliminates the context of some sentences and may give inaccurate results during retrieval, for example, the difference between the two phrases, "A man on a horse." and "A man and a horse." In addition, when inputting information that is to be associated with an image into the database, it has to be specified in a standardized form. The user is involved for part-of-speech disambiguation and word-sense disambiguation. This is time consuming and labor intensive.

Consequently, a need exists for a smart retrieval system to eliminate the above-described drawbacks.

SUMMARY OF THE INVENTION

The present invention is directed to overcoming one or more of the problems set forth above. Briefly summarized, according to one aspect of the present invention, the invention resides in a computer program product for retrieving multi-media objects using a natural language containing a pronoun, comprising: a computer readable storage medium having a computer program stored thereon for performing the steps of: (a) receiving a query in the natural language containing the pronoun; (b) determining the pronoun in the query; (c) determining whether either a phrase or sentence containing the pronoun conforms to a predetermined phrase structure; (d) determining a noun or noun phrase to which the pronoun refers based on step (c); and (e) processing the query based on step (d).

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of identifying antecedent basis for pronouns in search queries, such as in image retrieval and image captions.

DETAILED DESCRIPTION OF THE INVENTION

In the following description, the present invention will be described the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
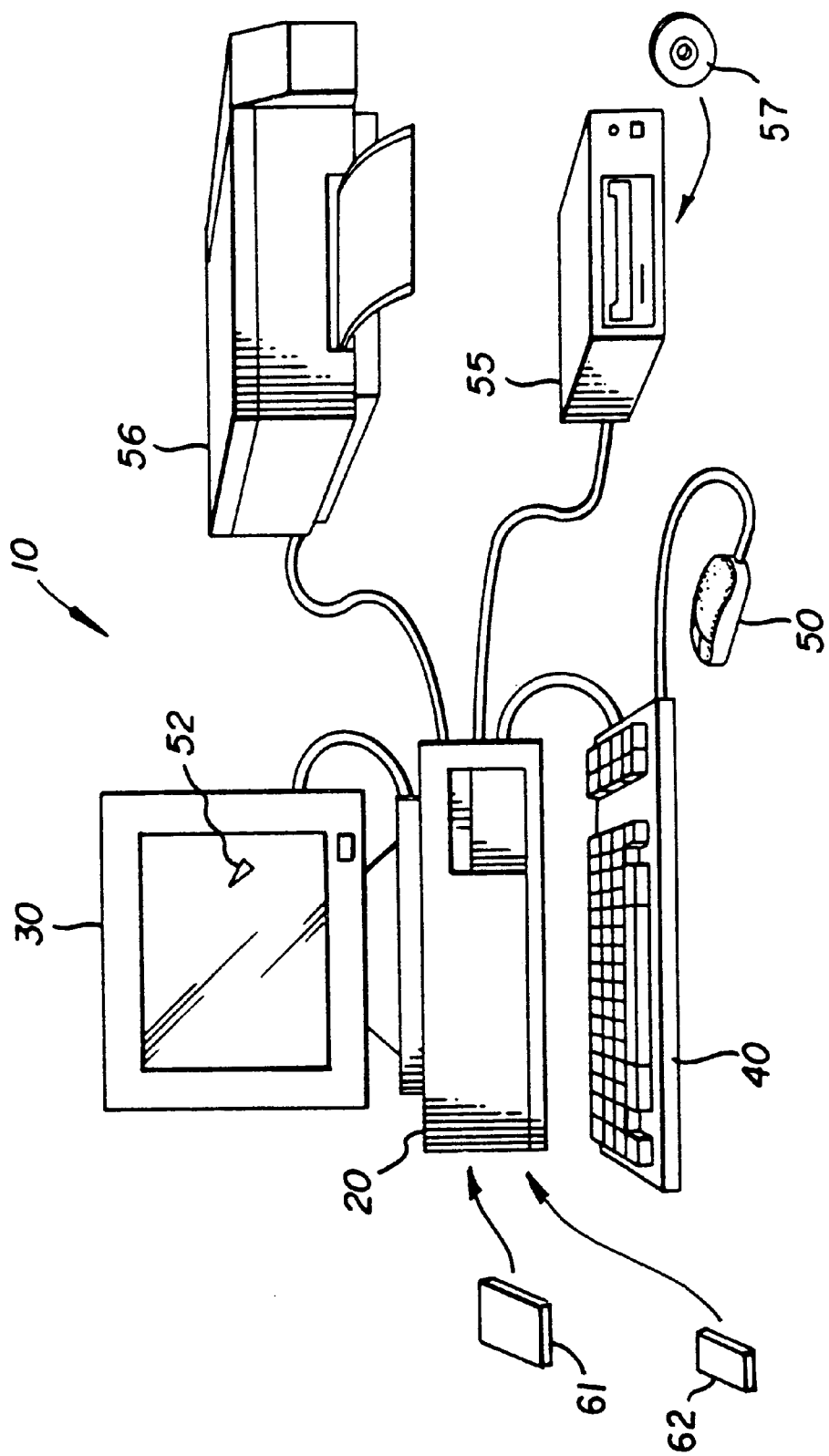
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 20 for receiving and processing software programs and for performing other processing functions. A display 30 is electrically connected to the microprocessor-based unit 20 for displaying user-related information associated with the software. A keyboard 40 is also connected to the microprocessor-based unit 20 for permitting a user to input information to the software. As an alternative to using the keyboard 40 for input, a mouse 50 may be used for moving a cursor 52 on the display 30 and for selecting an item on which the cursor 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor-based unit 20 for inputting the software program. Still further, the microprocessor-based unit 20 may be programmed, as is well known in the art, for storing the software program internally. A printer 56 is connected to the microprocessor-based unit 20 for printing a hard copy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor-based unit 20 for permitting visual display of the image on the display 30. These images may then be stored on electronic memory of the microprocessor-based unit 20, or transmitted to a mainframe computer and stored on its electronic memory (not shown). These stored images form a database from which images may be retrieved during a query of the present invention. These images may then be retrieved via natural language using a software program of the present invention.

Figure 2:
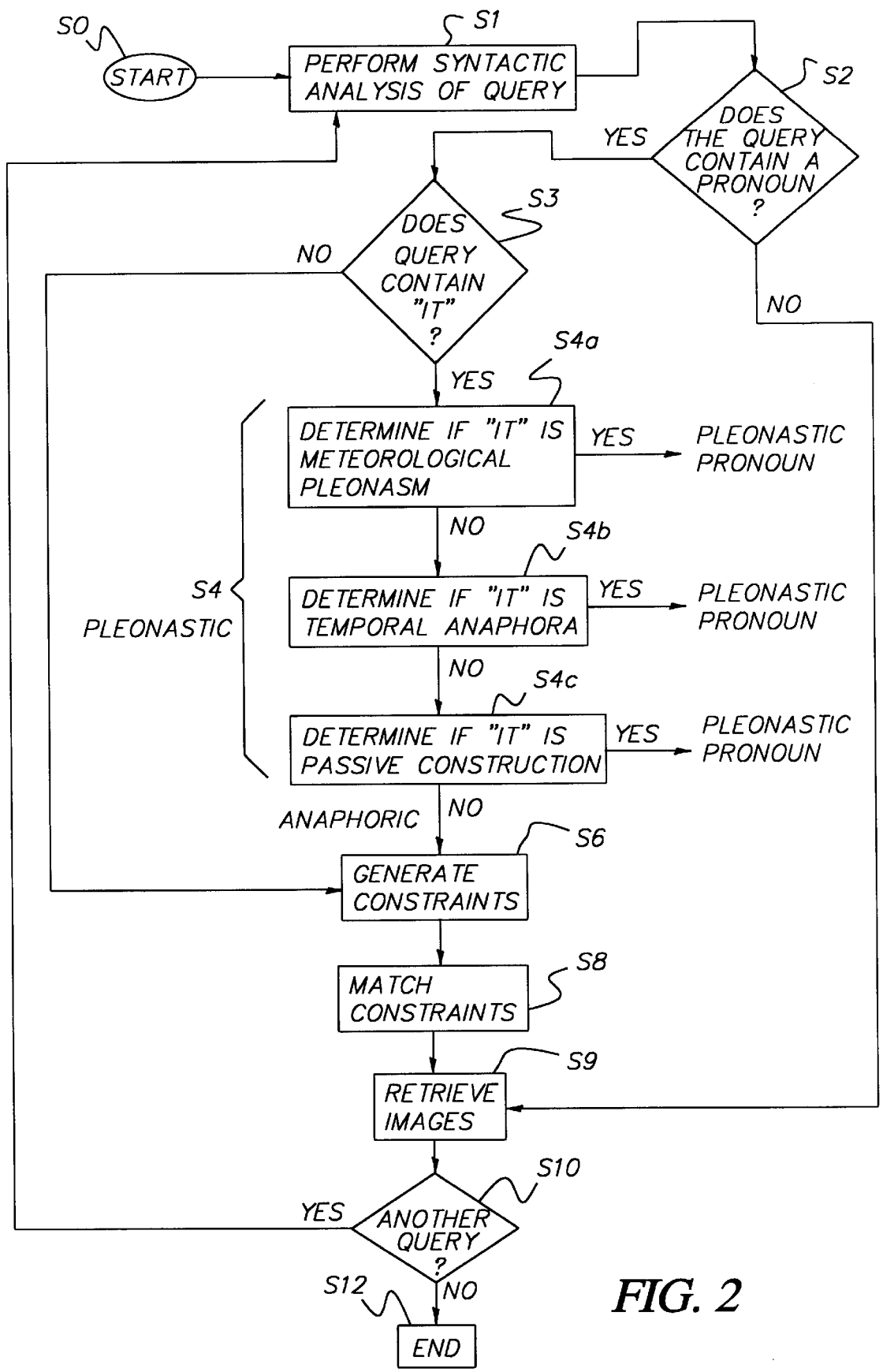
FIG. 2 is a flowchart illustrating an overview of the present invention.

Referring to FIG. 2, a flowchart is shown for illustrating an overview of a software program of the present invention. In this regard, the program is initiated S0, and a user inputs a query in a natural language, such as English, French or Spanish, for retrieving images corresponding to the particular query. The query is passed S1 through a syntactic analyzer for tagging each word and/or phrase in the query for parts of speech, such as noun, verb, pronoun and the like. In this regard, the word "it" is identified as a pronoun. The program extracts S1 any anaphoric references in the phrase or sentence: a phrase or sentence containing a pronoun. If there aren't any anaphoric references S2, the query is processed using any well-known retrieval program, such as those described above. If an anaphoric reference is detected, it is determined if the word is "it" S3. If it is not "it," the anaphoric is resolved and then the query is processed using any well known image retrieval process. If it is "it," the phrase or sentence is processed S4 in three steps for determining if the reference is a pleonastic pronoun. The three steps for determining if the word "it" is a pleonastic pronoun are: determining if "it" is a meteorological reference S4a, temporal anaphora S4b, or a passive construction S4c. A meteorological reference is one which refers to the weather, such as "It is raining", or "It is windy". Temporal anaphora refer to those appearing in connection with time references such as "It is early", or "It is 3 o'clock". A passive construction involves a passive verb such as "It is considered useful" or "It is believed reasonable". If a fit is not found in any of these pattern-matching steps, the program tags "it" as anaphoric. An anaphor is a backward reference to something that has already appeared in the input text. If a match is found, "it" is considered pleonastic and processing continues with the next input pronoun.

Next, the program generates syntactic and morphological constraints S6 on the nouns found in the input sentence or phrase. Such routines are well known in the art, and will not be discussed in detail herein. Typically, such routines determine if the noun is masculine, feminine, and the like. Finally, the program matches the pronoun with one of the nouns S8. The constraints given to the nouns determine the matching of the pronoun to the correct noun. The image or images are then retrieved S9 using any well-known software routine based on the query and the interpretation of the word "it" and other pronouns present.

The program then S10 returns for searching on another pronoun. If none is found, then the program receives the next user-inputted phrase or sentence, or is exited S12 depending on the user feedback.

Figure 3:
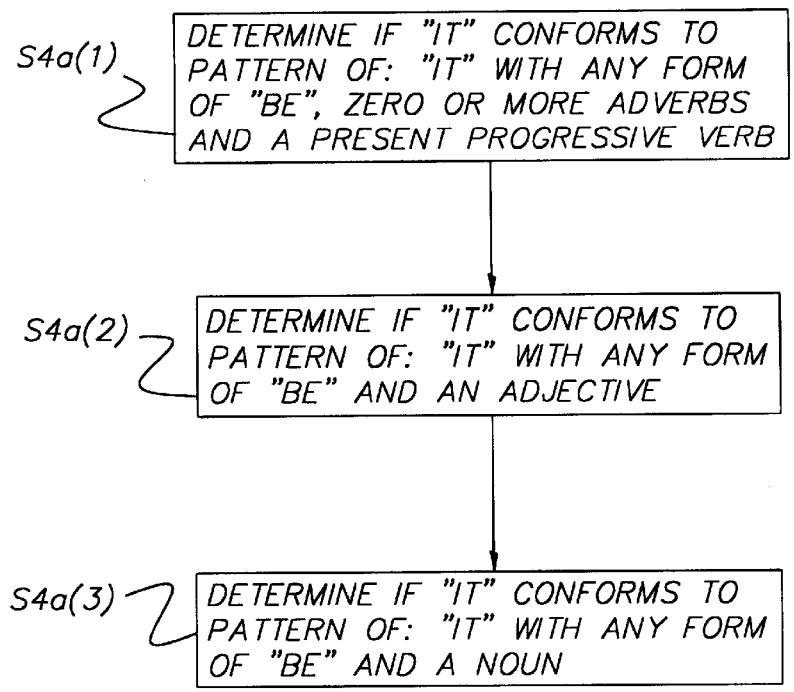
FIG. 3 is a detailed flowchart of a portion of FIG. 2.

Referring to FIG. 3, there is illustrated a detailed flowchart of the step of determining S4a if the word "it" is a meteorological pleonasm. The program searches the phrase or sentence structure containing "it" to determine S4a(1) if it includes the following: "it" with any form of the word "be," zero or more adverbs and a meteorologically related present progressive verb. The present progressive verbs preferably include: clear, dry, drizzling, freezing, gusting, blowing, hailing, misting, pouring, raining, sleeting, snowing, flurrying, and thundering.

If it does not fit this pattern, the program searches the phrase or sentence structure containing "it" to determine S4a(2) if it includes the following: "it" with any form of the word "be," and an adjective and the word "out" or "outside" and a date-specifier such as "today" or "tomorrow." The adjectives are preferably: bitter, blustery, bright, calm, chilly, clear, cloudy, cool, cold, crisp, damp, dark, dreary, drizzly, dry, fair, foggy, frigid, gloomy, gorgeous, gusty, hazy, horrible, hot, humid, lovely, mild, misty, nasty, nice, parched, pleasant, pretty, rainy, snowy, sunny, terrible, warm, wet, wild, windy, and ugly.

If it does not fit this pattern, the program searches the phrase or sentence structure containing "it" to determine S4a(3) if it includes the following: "it" with any form of the word "be," and a noun. The nouns are preferably: spring, summer, fall, autumn, and winter.

Figure 4:
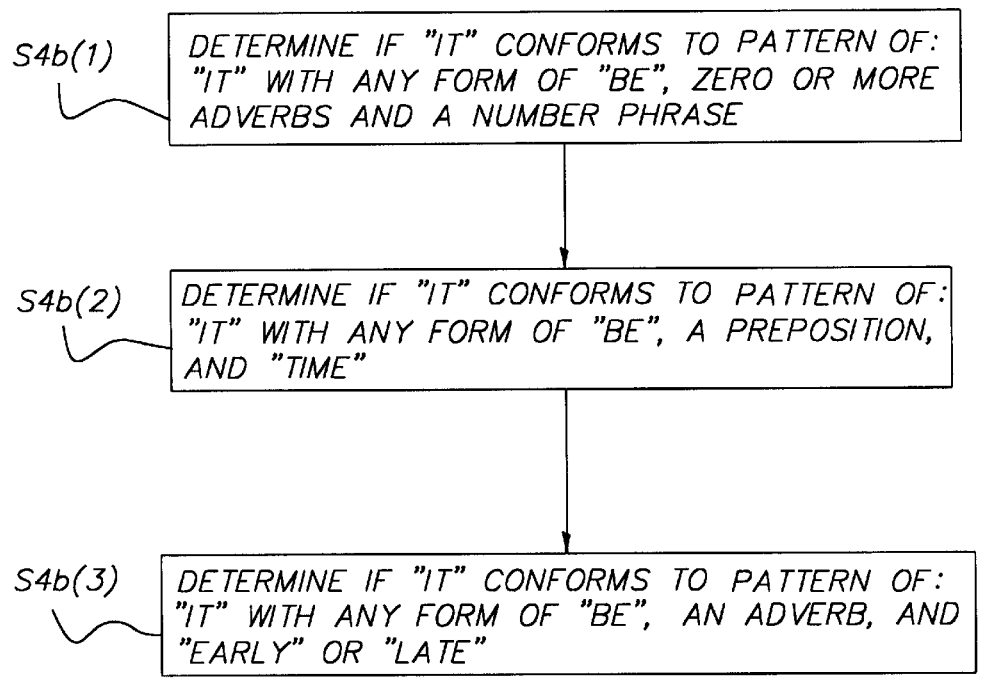
FIG. 4 is also a detailed flowchart of a portion of FIG. 2.

Referring to FIG. 4, there is illustrated a detailed flowchart of the step of determining if "it" is a temporal anaphor. The program searches the phrase or sentence structure containing "it" to determine S4b(1) if it includes the following structure: "it" with any form of the word "be," zero or more adverbs and a number phrase. The number phrases are time expressions such as "three o'clock," "2pm," "0800," and "a quarter past nine." The time expressions are extracted by the syntactic analyzer of step S2.

If it does not fit this pattern, the program searches the phrase or sentence structure containing "it" to determine S4b(2) if it includes the following: "it" with any form of the word "be," a preposition, and the word "time."

If it does not fit this pattern, the program searches the phrase or sentence structure containing "it" to determine S4b(3) if it includes the following: "it" with any form of the word "be," an adverb and the word "early" or "late."

Figure 5:
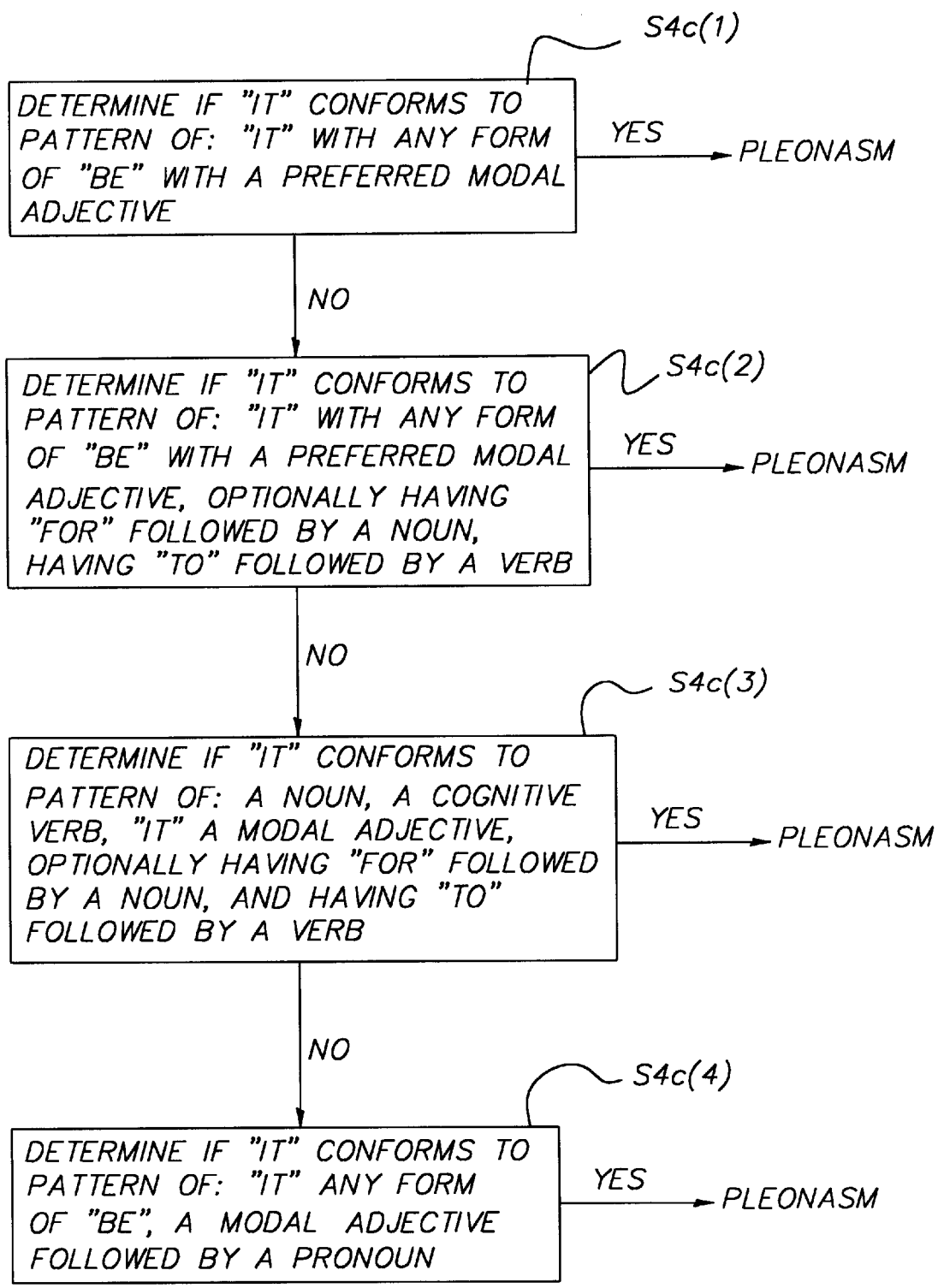
FIG. 5 is still further a detailed flowchart of a portion of FIG. 2.
Figure 6:
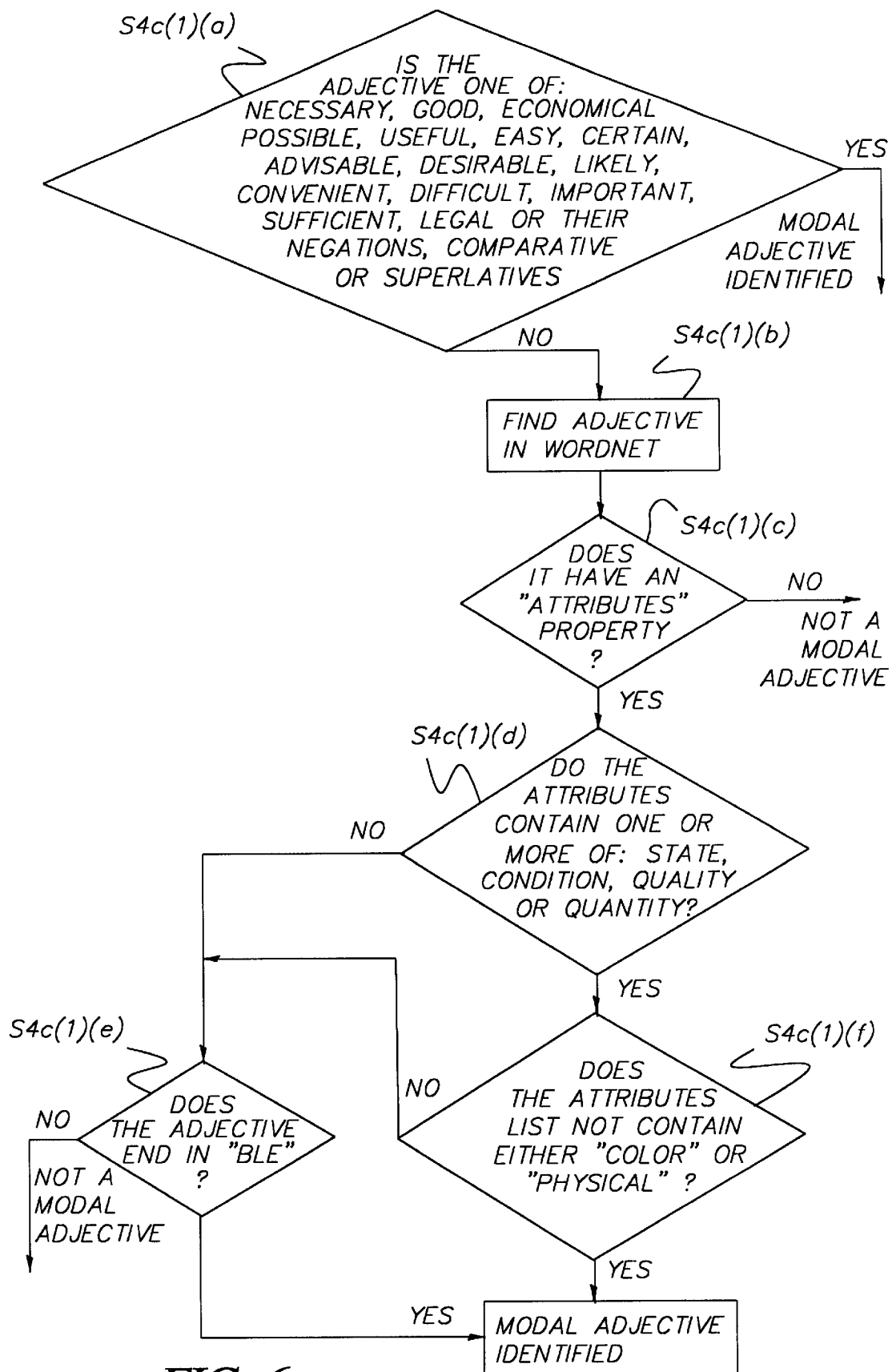
FIG. 6 is a detailed flowchart of a portion of FIG. 5.

Referring to FIG. 5, there is illustrated a detailed flowchart of the step of determining if "it" is a passive construction S4c. In this regard, the program searches the phrase or sentence structure containing "it" to determine S4c(1) if it includes the following: "it" with any form of the word "be" with a modal adjective. Referring briefly to FIG. 6, the subroutine for the determining if a word is modal adjective is illustrated. In this regard, the words are matched S4c(1)(a) against the following list of preferred model adjectives including their negations, comparatives, and superlatives: "necessary," "good," "economical," "possible," "useful," "easy," "certain," "advisable, " "desirable," "likely," "convenient," "difficult," "important," "sufficient," and "legal." (See "An Algorithm for Pronominal Anaphora Resolution" *Computational Linguistics* Vol. 20, No. 4, by Shalom Lappin and Herbert J. Leass for modal adjectives.) If a match exists, the word is identified as a model adjective. If there is not a match, the program calls up a thesaurus-type program for finding additional modal adjectives which are not included in the previous step S4c(1)(b). Such a program may be WordNet (see http://www.princeton.edu/~wn) which is accessible on the Internet. If an adjective listed therein does not have an "attributes" property S4c(1)(c), the adjective is not a modal adjective. If it does, it analyzed to determine if the attribute contains one or more of: "state," "condition," "quality," or "quantity" S4c(1)(d). If it does not, it is determined if the particular word ends in "-ble" S4c(1)(e). If it does, it is a modal adjective; if it does not, it is not a modal adjective. Returning to step S4c(1)(d), if the particular word does contain "state," "condition," "quality," or "quantity," it is then determined if the attribute does not list either "color" or "physical" S4c(1)(f). If it does, it is a modal adjective; if it does not, the word is input into the "-ble" routine S4c(1)(e) as described above.

Returning to FIG. 5, all words not matching the pattern of S4c(1) are further processed to determine if the phrase containing "it" conforms S4c(2) to a pattern of: "it" with any form of "be" with one of the preferred model adjectives listed above, optionally having "for" followed by a noun, and having "to" followed by a verb. If it does, it is identified as a passive construction pleonasm.

If it does not fit this pattern, the program searches the phrase or sentence structure containing "it" to determine if it includes the following pattern S4c(3): a noun, cognitive verb, "it," a modal adjective, optionally "for" and a noun, and having "to" followed by a verb. If it does, it is labeled a passive construction.

If it does not fit this pattern, the program searches the phrase or sentence structure containing "it" to determine if it includes the following pattern S4c(4): "it," any form of "be," a modal adjective, followed by a pronoun. If it does, it is labeled a passive construction.

The invention has been described with reference to a preferred embodiment. However, it will be appreciated that variations and modifications can be effected by a person of ordinary skill in the art without departing from the scope of the invention. For example, this method can be used to resolve anaphora in captions as well as queries.

What is claimed is:

1. A computer program product for retrieving multi-media objects using a natural language containing a pronoun, comprising: a computer readable storage medium having a computer program stored thereon for performing the steps of:
   (a) receiving a query in the natural language containing the pronoun;
   (b) determining the pronoun in the query;
   (c) determining whether either a phrase or sentence containing the pronoun conforms to a predetermined phrase structure;
   (d) determining a noun or noun phrase to which the pronoun refers based on step (c); and
   (e) processing the query based on step (d).

2. The computer program product as in claim 1, wherein step (a) includes using "it" as the pronoun.

3. The computer program product as in claim 2, where step (c) includes using either a meteorological phrase structure, temporal phrase structure or passive construction phase structure as the predetermined phrase structure.

4. The computer program product as in claim 3 further comprising the step of identifying "it" as anaphoric if there is not a meteorological phrase structure, temporal phrase structure or passive construction phase structure match.

5. The computer program product as in claim 3, wherein using the meteorological phrase structure includes determining whether the meteorological phrase structure conforms to the structure of: "it" with any form of "be," zero or more adverbs and a present progressive verb.

6. The computer program product as in claim 3, wherein using the meteorological phrase structure includes determining whether the meteorological phrase structure conforms to the structure of: "it" with any form of "be," and an adjective.

7. The computer program product as in claim 3, wherein using the meteorological phrase structure includes determining whether the meteorological phrase structure conforms to the structure of: "it" with any form of "be," and a noun.

8. The computer program product as in claim 3, wherein using the temporal phrase structure includes determining whether the temporal phrase structure conforms to the structure of: "it" with any form of "be," an adverb, and either the word "early" or "late."

9. The computer program product as in claim 3, wherein using the temporal phrase structure includes determining whether the temporal phrase structure conforms to the structure of: "it" with any form of "be," a preposition, and the word "time."

10. The computer program product as in claim 3, wherein using the temporal phrase structure includes determining whether the temporal phrase structure conforms to the structure of: "it" with any form of "be," zero or more adverbs, and a number phrase.

11. The computer program product as in claim 3, wherein using the passive-construction phrase structure includes determining whether the passive-construction phrase structure conforms to the structure of: "it" with any form of "be," and a modal adjective.

12. The computer program product as in claim 11 further comprising the step of using either "necessary," "good," "economical," "possible," "useful," "easy," "certain," "advisable," "desirable," "likely," "convenient," "difficult," "important," "sufficient," "legal" or their negations, comparatives or superlatives as the modal adjective.

13. The computer program product as in claim 3, wherein using the passive-construction phrase structure includes determining whether the passive-construction phrase structure conforms to the structure of: "it" with any form of "be," a modal adjective, optionally having "for" followed by a noun, and having "to" followed by a verb.

14. The computer program product as in claim 3, wherein using the passive-construction phrase structure includes determining whether the passive-construction phrase structure conforms to the structure of: a noun, a cognitive verb, "it," a modal adjective, optionally having "for" followed by a noun, and having "to" followed by a verb.

15. The computer program product as in claim 3, wherein using the passive-construction phrase structure includes determining whether the passive-construction phrase structure conforms to the structure of: "it" with any form of "be," and a modal adjective followed by a pronoun.

* * * * *